United States Patent [19]

Tajima

[11] Patent Number: 5,222,150
[45] Date of Patent: Jun. 22, 1993

[54] VOLUME CONTROL CIRCUIT

[75] Inventor: Shigeru Tajima, Kanagawa, Japan

[73] Assignee: Sony Corporation, Tokyo, Japan

[21] Appl. No.: 715,645

[22] Filed: Jun. 14, 1991

[30] Foreign Application Priority Data

Jun. 22, 1990 [JP] Japan .................................. 2-164491

[51] Int. Cl.$^5$ .............................................. H03G 3/00
[52] U.S. Cl. ..................................... 381/105; 381/123;
381/77; 381/28; 369/2; 369/6
[58] Field of Search ................... 369/2, 6; 381/28, 79,
381/123, 85; 358/194.1

[56] References Cited

U.S. PATENT DOCUMENTS

| | | | |
|---|---|---|---|
| 3,398,240 | 8/1968 | Owens | 381/81 |
| 3,493,681 | 2/1970 | Richards | 381/81 |
| 4,334,242 | 6/1982 | Mangold | 358/194.1 |
| 4,527,204 | 7/1985 | Kozakai et al. | 358/194.1 |
| 4,751,581 | 6/1988 | Ishiguro et al. | 358/194.1 |
| 4,864,550 | 9/1989 | Kawanaka | 369/6 |

FOREIGN PATENT DOCUMENTS 129595  5/1989  Japan .............................. 358/194.1

Primary Examiner—Forester W. Isen
Attorney, Agent, or Firm—Lewis H. Eslinger; Jay H. Maioli

[57] ABSTRACT

A volume control circuit in a system including a tuner and a deck which are prepared as separate components and combined together. The tuner has a control purpose audio input terminal, an audio output terminal, and an audio output level variable circuit provided between the control purpose audio input terminal and the audio output terminal. The tuner further includes a controller for setting the gain of the audio output level variable circuit. The deck has an audio output terminal connected to the control purpose audio input terminal of the tuner so as to issue an audio signal from the audio output terminal of the tuner. The controller of the tuner controls the gain of the audio output level variable circuit to vary the output volume.

3 Claims, 2 Drawing Sheets

VOLUME CONTROL CIRCUIT

BACKGROUND OF THE INVENTION

1. Field of the Invention

This invention relates to a volume control circuit suitable for use, in particular, in an AV (audio/video) system in which an 8 mm VTR deck and a tuner are separate components.

2. Description of the Prior Art

A video composite system has been proposed in which an 8 mm VTR deck, a liquid crystal color monitor, and a tuner are prepared separately and can be combined to set up an Av system. Such a video composite system allows various usage users may desire, such as, not only using it as a small-scaled AV system but also using the 8 mm VTR deck alone for edit purposes, and using the 8 mm VTR deck with a video camera connected. Additionally, speakers with a built-in amplifier may be coupled to the 8 mm VTR deck to set up an AV system for full-scale audio reproduction.

If the video composite system is equipped with a remote commander for channel changeover, volume adjustment and so on, it will be convenient to use an AV system which is made thereof. The 8 mm VTR deck of the video composite system is often used as a separate portable device whereas the tuner is normally used in a stationary condition in a room or a car. For this reason, an optical sensor of the remote commander is provided in the tuner.

When the optical sensor of the remote commander is provided in the tuner, it is easy to arrange the system to permit channel changeover through the remote commander. By coupling the tuner and the 8 mm VTR deck via a general digital signal conductor, it is also relatively easy to arrange the system to select a mode of the 8 mm VTR through the remote commander.

If the optical sensor of the remote commander is provided in the tuner, it is difficult to control the audio output level of the VTR deck. More specifically, in order to control the audio output level of the 8 mm VTR deck, it is necessary to equip the 8 mm VTR deck with an electronic volume control variable in gain according to a value set and to connect the electronic volume control of the 8 mm VTR deck and a system controller of the tuner having the optical sensor of the remote commander via a particular signal conductor. This, however, requires the particular signal conductor for connection between the 8 mm VTR deck and the tuner, and hence increases the number of connectors and makes it difficult to decrease the size of the system.

When a full-scale Av system is set up by connecting speakers with a built-in amplifier to the 8 mm VTR deck, it is strongly desired to allow volume adjustment through a remote commander.

OBJECTS AND SUMMARY OF THE INVENTION

It is, therefore, an object of the invention to provide a volume control circuit which permits a remote commander to vary the audio output level but does not require any particular additional signal conductor when an audio video system is set up by combining an 8 mm VTR deck and a tuner.

In accordance with an aspect of the present invention, there is provided a volume control circuit in a system including a tuner and a deck which are prepared as separate components and combined together, in which:

the tuner has a control purpose audio input terminal, an audio output terminal, and an audio output level variable circuit provided between the control purpose audio input terminal and the audio output terminal, and the tuner further includes a controller for setting the gain of the audio output level variable circuit;

the deck has an audio output terminal connected to the control purpose audio input terminal of the tuner so as to issue an audio signal from the audio output terminal of the tuner; and the controller of the tuner controls the gain of the audio output level variable circuit to vary the output volume.

The audio output level variable circuit is provided between the control purpose audio input terminal and the audio output terminal of the tuner, the audio output terminal of the deck is connected to the control purpose audio input terminal of the tuner, and active speakers are coupled to the audio output terminal of the tuner. This arrangement makes it possible to adjust the volume through the remote commander without using a particular signal conductor.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

An embodiment of the invention is described below, referring to drawings.

Figure 1:
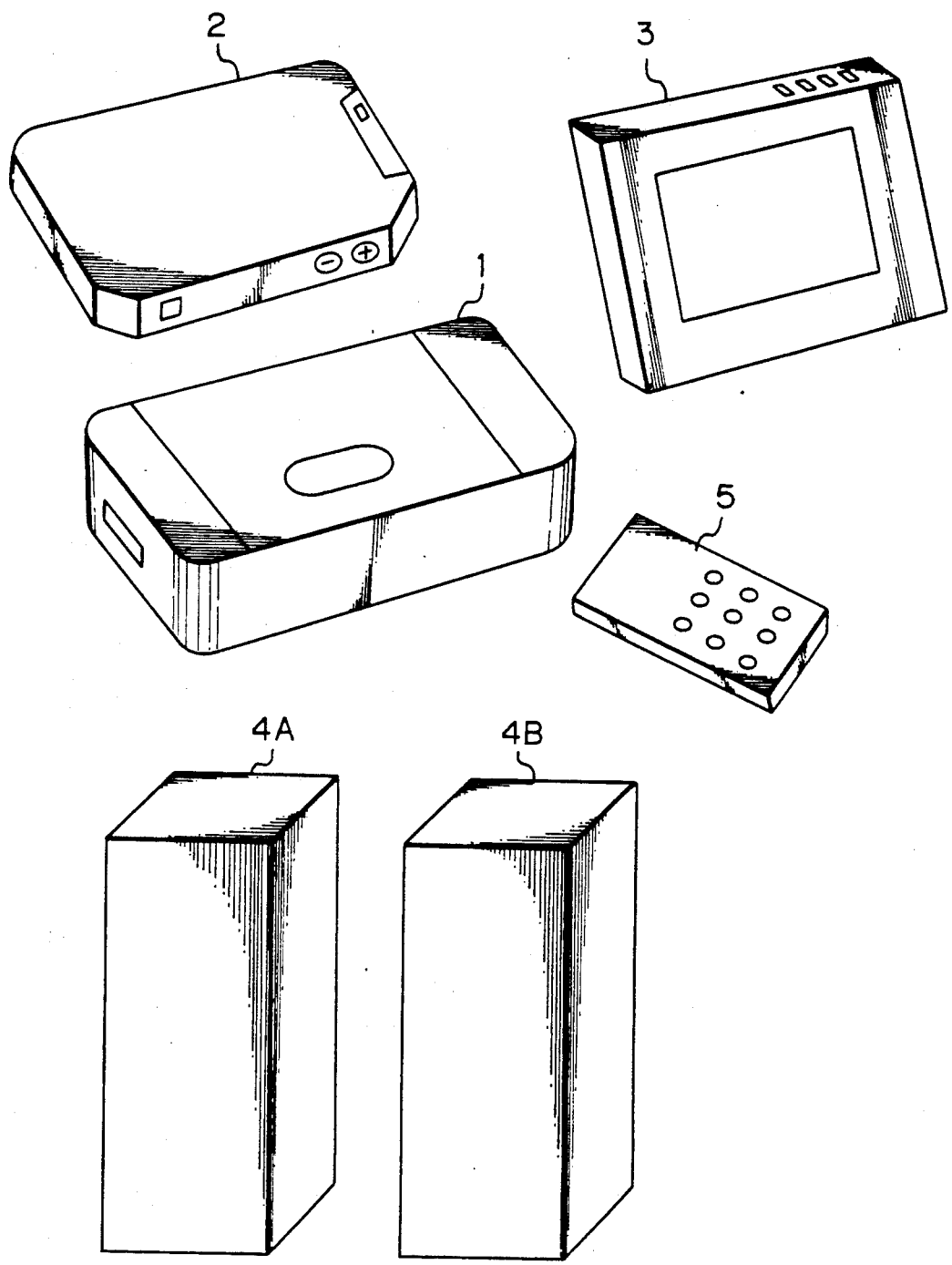
FIG. 1 is a perspective view for use in explanation of au audio video system to which the invention is applicable.

FIG. 1 shows components of an audio video system to which the invention is applicable. In FIG. 1, reference numeral 1 designates an 8 mm VTR deck for recording and reproducing video signals. An 8 mm tape cassette is loaded in the 8 mm VTR deck 1. The 8 mm VTR deck 1 may be used alone for edit purpose, or in combination with a video camera.

Reference numeral 2 denotes a tuner. The tuner 2 receives a desired television broadcasting and demodulates a video signal. The tuner 2 is equipped with an optical sensor 44 for a remote commander, and a controller. The tuner 2 is normally placed in a stationary condition in a room or a car.

Reference numeral 3 designates a liquid crystal color monitor. A reproduced signal from the 8 mm VTR deck 1 or a demodulated signal from the tuner 2 is visually displayed on the liquid crystal color monitor 3.

Reference numerals 4A and 4B denote active speakers. The active speakers 4A and 4B contain built-in amplifiers. By combining the active speakers 4A and 4B, powerful reproduced sound is obtained.

Reference numeral 5 refers to a remote commander. The optical sensor 44 for the remote commander 5 is provided in the tuner 2 as explained above. Channel setting and mode setting can be done through the remote commander 5. In this embodiment of the invention, volume adjustment can also be done through the remote commander 5 when the active speakers 4A and 4B are equipped, as described later in greater detail.

Figure 2:
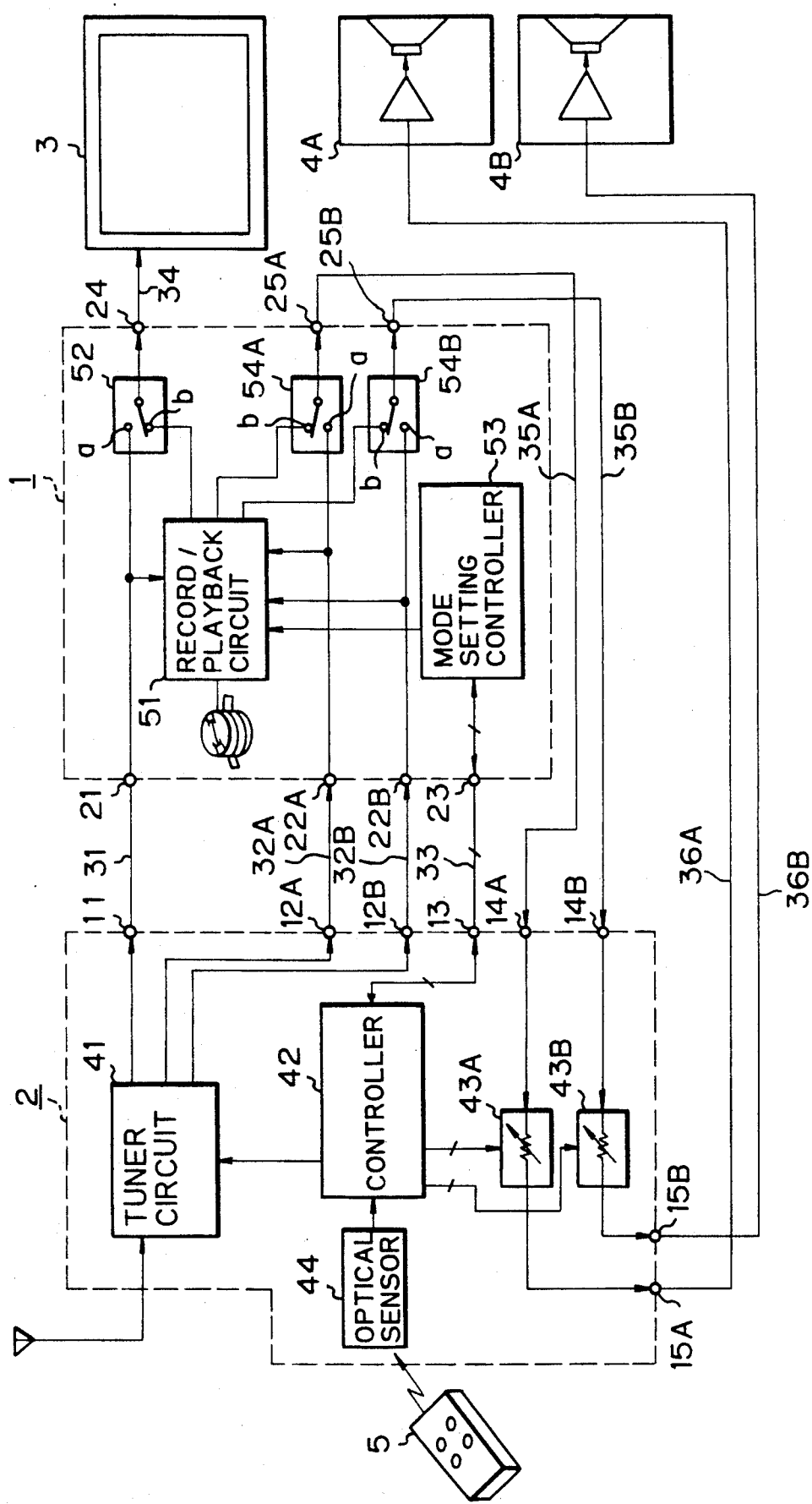
FIG. 2 is a block diagram of an embodiment of the invention.

FIG. 2 shows an example of audio video system arranged by combining the respective components.

In FIG. 2, the tuner 2 has a video output terminal 11, right and left first audio output terminals 12A and 12B, control signal input/output terminal 13, right and left audio input terminals for control purpose 14A and 14B, and second audio output terminals 15A and 15B. The 8 mm VTR deck 1 has a video input terminal 21, right and left audio input terminals 22A and 22B, control signal input/output terminal 23, video output terminal 24, and right and left audio output terminals 25A and 25B.

The video output terminal 11 of the tuner 2 and the video input terminal 21 of the 8 mm VTR deck 1 are coupled by a signal conductor 31. The audio output terminals 12A and 12B of the tuner 2 are coupled respectively to the audio input terminals 22A and 22B of the 8 mm VTR deck 1 by signal conductors 32A and 32B. The control signal input/output terminal 13 of the tuner 2 is coupled to the control signal input/output terminal 23 of the 8 mm VTR deck 1 by a bus 33.

The video output terminal 24 of the 8 mm VTR deck 1 is coupled to the liquid crystal color monitor 3 by a signal conductor 34. The audio output terminals 25A and 25B of the 8 mm VTR deck 1 are coupled respectively to the control purpose audio input terminals 14A and 14B of the tuner 2 by signal conductors 35A and 35B. The audio output terminals 15A and 15B of the tuner 2 are coupled respectively to the active speakers 4A and 4B by signal conductors 36A and 36B.

In a tuner circuit 41 of the tuner 2, a desired television broadcasting is selected, and the selected television broadcasting signal is demodulated. Channel setting by the tuner circuit 2 depends on a channel select signal from a controller 42.

A video signal from the tuner 2 is supplied from the video output terminal 11 through the signal conductor 31 to the video input terminal 21 of the 8 mm VTR deck 1, and the signal is fed to a record/playback circuit 51 and to an a-side input terminal of a switch circuit 52. Right and left audio signals from the tuner circuit 2 are supplied from the audio output terminals 12A and 12B through the signal conductors 32A and 32B to the audio input terminals 22A and 22B of the 8 mm VTR deck 1. These signals are fed to the record/playback circuit 51 and to a-side input terminals of switch circuits 54A and 54B.

The record/playback circuit 51 changes its mode in response to a mode setting signal from a mode setting controller 53. During recording, signals from the video input terminal 21, audio input terminals 22A and 22B are sent to and processed by the record/playback circuit 51, and a resulting signal is recorded on a tape.

During playback, a playback signal from the tape is processed by the record/playback circuit 51, and a playback video signal is supplied from the record/playback circuit 51 to the b-side input terminal of the switch circuit 52 whereas playback audio signals are supplied to the b-side input terminals of the switch circuits 54A and 54B.

The switch circuits 52, 54A and 54B are changed to their a-side terminals for display of a received television broadcasting picture on the liquid crystal color monitor 3, but they are changed to their b-side terminals for display of a video playback picture on the liquid crystal color monitor 3.

A video signal from the switch circuit 52 is supplied from the video output terminal 24 through the signal conductor 34 to the liquid crystal color monitor 3. A picture based on the video signal is displayed on the liquid crystal color monitor 3.

Audio signals from the switch circuits 54A and 54B are supplied respectively from the audio output terminals 25A and 25B through the signal conductors 35A and 35B to the control purpose audio input terminals 14A and 14B of the tuner 2. These signals pass through electronic volume controls 43A and 43B and are issued from the audio output terminals 15A and 15B. Gains of the electronic volume controls 43A and 43B are set according to an audio level setting signal from the controller 42.

Audio signals from the audio output terminals 36A and 36B are supplied to the active speakers 4A and 4B. Playback sound based on the audio signals is issued from the active speakers 4A and 4B.

The optical sensor 44 is provided in the tuner 2. A command signal from the remote commander 5 is sent through the optical sensor 44 to the controller 42. A user may use the remote commander 5 for channel setting, mode setting and volume adjustment.

For channel setting, a channel select signal is issued from the controller 42 in response to a command signal from the remote commander 5. The channel select signal is supplied to the tuner circuit 41 to have it select a channel requested.

For mode setting, a mode setting signal is issued from the controller 42 in response to a command signal from the remote commander 5. The mode setting signal is sent through the bus 33 to a mode setting controller 53 of the 8 mm VTR deck 1 to have it set a mode requested.

For volume adjustment, an audio level setting signal is issued from the controller 42 in response to a command signal from the remote commander 5. The audio level setting signal is supplied to the electronic volume controls 43A and 43B to have them adjust the volume.

According to the invention, the audio output level variable circuit 43A,43B is provided between the control purpose audio input terminal 14A,14B and the audio output terminal 15A,15B in the tuner, and the gain of the audio output level variable circuit can be controlled through the remote commander. Therefore, by connecting the audio output terminal of the deck to the control purpose audio input terminal of the tuner to supply an output from the audio output terminal of the tuner to the active speakers, an audio signal is issued through the audio output level variable circuit of the tuner, so that volume adjustment is effected by varying the gain of the audio output level variable circuit through the remote commander.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is

1. A volume control circuit in a system including a tuner and a deck which are prepared as separate components and combined together, in which:

said tuner has a first audio output terminal, a control purpose audio input terminal, a second audio output terminal, and an audio output level variable circuit provided between said control purpose audio input terminal and said second audio output terminal, said tuner further including a controller for setting the gain of said audio output level variable circuit;

said deck has an audio output terminal connected to said control purpose audio input terminal of said tuner so as to issue an audio signal from said second audio output terminal of said tuner, an audio input terminal for coupling the audio output from said first audio output terminal of said tuner to said deck, and a switch circuit for selecting the output signal from the audio input terminal of said deck or the audio signal reproduced in said deck and outputting a selected signal to said audio output terminal of said deck; and said controller of said tuner controls said switch circuit and the gain of said audio output level variable circuit to vary the output volume.

2. A volume control circuit according to claim 1, wherein, when said tuner alone is used, said control purpose audio input terminal and said first audio output terminal of said tuner are coupled and the gain of said audio output level variable circuit is controlled by said controller of said tuner.

3. A volume control circuit according to claim 1, said tuner further including an optical sensor for a remote commander and said tuner being controllable by the remote commander.

* * * * *